US012577056B2

(12) United States Patent (10) Patent No.: US 12,577,056 B2
Hashem (45) Date of Patent: Mar. 17, 2026

(54) BRANCH ASSEMBLY SYSTEM AND METHOD

(71) Applicant: VIVET Technology LLC, Dearborn, MI (US)

(72) Inventor: Amjad Qusay Hashem, Dearborn, MI (US)

(73) Assignee: Vivet Technology LLC, Dearborn, MI (US)

( * ) Notice: Subject to any disclaimer, the term of this patent is extended or adjusted under 35 U.S.C. 154(b) by 123 days.

(21) Appl. No.: 17/804,553

(22) Filed: May 27, 2022

(65) Prior Publication Data

US 2022/0380131 A1 Dec. 1, 2022

Related U.S. Application Data

(60) Provisional application No. 63/193,635, filed on May 27, 2021.

(51) Int. Cl.
*B65G 47/46* (2006.01)
*B65G 41/00* (2006.01)
*B65G 47/48* (2006.01)
*G06Q 50/04* (2012.01)

(52) U.S. Cl.
CPC ............. *B65G 41/00* (2013.01); *G06Q 50/04* (2013.01)

(58) Field of Classification Search
CPC ........ B65G 41/00; B65G 47/02; B65G 47/46; B65G 47/48; G06Q 50/04
USPC .......... 198/346.2, 349, 369.1, 570, 575, 890
See application file for complete search history.

(56) References Cited

U.S. PATENT DOCUMENTS

| | | | | |
|---|---|---|---|---|
| 6,336,546 | B1 * | 1/2002 | Lorenz | H01L 21/67736 |
| | | | | 198/346.2 |
| 7,798,758 | B2 * | 9/2010 | Bufano | H01L 21/6773 |
| | | | | 414/222.01 |
| 8,776,985 | B2 * | 7/2014 | Huettner | B65G 54/02 |
| | | | | 198/459.8 |
| 10,167,143 | B2 * | 1/2019 | Senn | B65G 37/02 |
| 10,233,019 | B2 * | 3/2019 | Lert | B65G 1/065 |
| 10,583,986 | B2 * | 3/2020 | Wagner | B65G 47/962 |
| 10,613,523 | B2 * | 4/2020 | Burkhard | G05B 19/4189 |
| 10,712,195 | B2 * | 7/2020 | Skrædderdal | B26D 7/0625 |
| 10,737,403 | B2 * | 8/2020 | Bauer | B26D 7/32 |
| 10,908,596 | B2 * | 2/2021 | Wahrén | G05B 19/4189 |
| 2016/0016735 | A1 * | 1/2016 | Binder et al. | |

* cited by examiner

*Primary Examiner* — Douglas A Hess
(74) *Attorney, Agent, or Firm* — ROCKLAW PLLC

(57) ABSTRACT

A branch assembly system may include a transport system having a main transport line, branch transport lines, and branch stations including branch operations. The system may be configured to move parts by the branch transport lines. The system may move parts to the branch stations according to respective branch operations.

20 Claims, 5 Drawing Sheets

BRANCH ASSEMBLY SYSTEM AND METHOD

CROSS-REFERENCE TO RELATED APPLICATION

This non-provisional application is based on and claims priority to U.S. Provisional Patent Application No. 63/193,635 filed May 27, 2021, which is incorporated by reference in its entirety.

BACKGROUND

Traditional assembly techniques include non-expandable, non-modular, and antiquated arrangements and processes. Typical systems require significant modifications to change, add, or remove operations. Prior systems are overly rigid and require considerable time and costs to rebuild the system. Typical systems fail to accommodate operational and capacity adjustments.

There is a need for systems and methods as disclosed herein that solve the above problems. The present disclosure provides a branch assembly system and method. The embodiments herein provides advantages, improvements, and solutions over prior systems.

DETAILED DESCRIPTION

Figure 1:
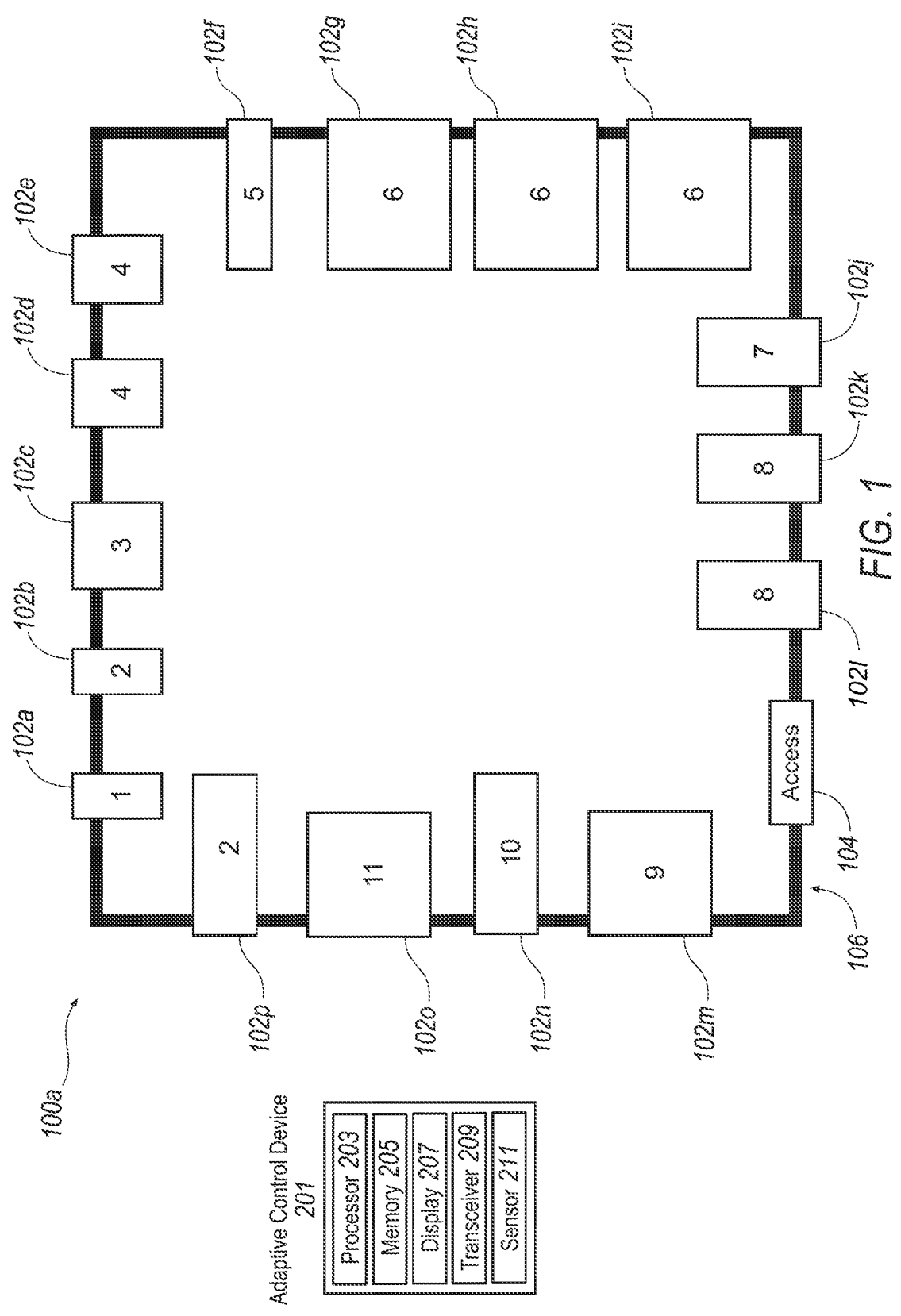
FIG. 1 illustrates an exemplary system of the present disclosure.

Embodiments may include a branch assembly system and method configured for improved scalability, reduced footprint, increased surrounding space, reduction of wasted space, and flexibility in balanced and unbalanced systems. Any operation herein can be scaled infinitely with additional or different operations being expanded along a first direction or axis and additional or different tasks for the same operation being expanded along a second direction or axis. Operations may be adapted, added, or removed without interrupting production. The system may be configured to change, add, or remove tasks and operations (e.g., one or more related tasks) by adjusting the ends one direction or axis, or both directions or axes.

The systems and methods herein may include improved branch assembly structures and operations. The system may include any manufacturing system designed and optimized for throughput. The system may be adaptive, scalable, and modular according to assembly and manufacturing specifications of any product. The system may provide one or more operations involving single or multiple tasks, independent or interdependent processes, sequential or simultaneous steps, and similar or varying cycle and output times. The system may utilize a transport system including one or more branches. The branches may be arranged and positioned according to access and logistical requirements.

The system may be arranged as an assembly or manufacturing system with various advantages and improvements over traditional platforms. These include improved throughput, cycle times, cycle time balance, logistics management, design flexibility and complexity, output frequencies and quantities, cost effectiveness, operational costs, space efficiency, physical footprint, build time, time-to-market, scalability, modularity, and downtime risks. The system is scalable by adding one or more assembly line branches, and modular by allowing rearrangement of assembly line branches. The system may replace multiple stand-alone platforms with traditional techniques. The system has a reduced physical footprint as expansion is accomplished by adding one or more assembly line branches rather than require system replacement. The system may be utilized for any product or industry such as the automotive, aerospace industries, food, pharmaceutical, consumer products, etc.

The system may include a transport system having one or more main transport lines, main stations, branch transport lines, and branch stations configured to optimize a branch assembly process having one or more main and branch operations. The one or more main transport lines may include primary transport lines, alternative transport lines, or a combination thereof. The transport system may move one or more parts to one or more main and branch stations having corresponding main and branch operations. Each transport line may include one or more main stations and connected to one or more branch lines having branch stations associated with one or more tasks or operations.

Each branch line may extend substantially transverse or perpendicular to one or more respective transport lines. Each branch line may include one or more branch stations having one or more operations, e.g., redundant or unique relative to the main or other branch operations. Each station may perform its corresponding operation and confirm completion of the corresponding operation.

A branch assembly system may include a transport system having a main transport lines, a branch transport line, and first and second branch stations with first and second branch operations. The transport system is configured to move, by the branch transport line, the part to the first and second branch stations according to respective first and second branch operations.

A branch assembly method comprising providing a transport system having a main transport line, a branch transport line, and first and second branch stations with respective first and second branch operations. The method may include moving by the main transport line a part relative to the branch transport line according to the first and second branch operations. The method may include moving by the branch transport line the part to the first branch station associated with the first branch operation and performing the first branch operation. The method may include moving by the branch transport line the part to the second branch station associated with the second branch operation and performing the second branch operation. The method may include confirming completion of the first and second branch operations. The method may include moving the part to the main transport line for one or more next operations.

Upon or after completion of each operation, the transport line may move the one or more parts to the main or branch station for the next operation of the branch assembly process, move past and not enter any main or branch stations not associated with the next operation, or a combination thereof.

The transport system may be configured to optimize part quantities to ensure continuous flow of parts for optimized throughput.

The system may be structurally arranged in a branch configuration layout configured for the part to be selectively processed through one or more of the first and second branch stations. The system may be structurally arranged in a branch configuration layout such that the part is processed or assembled by one, a plurality, or all of the first and second branch stations.

The system may include one or more branch processes or branch configuration layouts configured for pre-defined, real-time, or sequenced adaptation to retract or extend the first and second branch stations with a third branch station that is similar or different from the first and second branch stations, adaptation of at least one of scale, productivity, and efficiency, pre-defined, real-time, or sequenced adaptation to add, remove or change one or more branch processes, adaptation performed manually, automatically, or semi-automatically, adaptation performed by one or all of an automated control device and an operator, or a combination thereof.

The system may include one or more branch processes or branch configuration layouts including similar or different cycle times. The system may include one or more branch processes or branch configuration layouts configured for at least one of a balanced cycle time, an unbalanced cycle time, or an adaptive cycle time.

FIGS. 1-6 illustrate an exemplary system 100 including baseline system 100a and branch assembly systems 100b-f. System 100 may take many different forms and include multiple and/or alternate components, structures, and arrangements. While an exemplary system 100 is shown, the exemplary components are not intended to be limiting, and additional or alternative components and/or implementations may be used.

System 100 may include one or more of devices 201 (e.g., adaptive control devices), processor 203 (e.g., hardware processor), memory 205 (e.g., physical memory), display 207 (e.g., hardware display or screen for displaying a user interface), transceiver 209 (e.g., hardware transceiver), and sensor 211. System 100 may include or be in communication with a transport system, network, server, database, or a combination thereof. Any component of system 100 may include processor 203, memory 205, display 207, transceiver 209, and sensor 211 configured store, communicate, display, and adapt information and transfer the information with respect to any other component thereof.

System 100 may provide information that may include or relate to any of the operations herein, instructions executed by processor 203. The operations herein may utilize one or more processes, user inputs, outputs, heuristics, user interfaces, sensor information, cycle time, parts/jobs per hour, parts/jobs per year, geospatial information, location, x-y gantry, x-y-z position, proximity, time, temperature, quality, transparency, weight, part, machine and/or user information, or any combination thereof.

System 100 may communicate, by way of processor 203, memory 205, display 207, and transceiver 209, any information between one or more devices 201, servers, databases, networks, or any combination thereof. Device 201 may include an adaptive control device configured to perform one or more processing, machining, assembly and/or tooling operations including, e.g., feed tray transport, empty tray transport, assembly tray transport, stacker, operator device, xy or xyz gantry, robot, actuator, or any combination thereof. Device 201 may be operatively connected to one or more other components and/or operations of system 100, e.g., stations 102, device 104, transport system (with transport lines 106 and/or 108), or a combination thereof.

Device 201 may include one or a combination of computing, input-output, display and/or hardware devices such as a computer, mobile phone, smartphone, desktop, laptop, tablet, headset, handheld, watch, and/or touchscreen device. System 100 may adapt by processor 203 and/or display 207 any information and operations herein. Device 201 and the transport system may include one or more sensor 211 to provide sensor information, compare sensor information with the other information disclosed herein, and/or to trigger or adapt any of the operations herein in response to the comparison.

In embodiments, system 100 may include one or more stations 102 (e.g., stations 102a-p), access device 104, and transport lines 106. System 100 may be configured to add parts by one or more devices (e.g., feed tray transport) of station 102a to transport system 106 (e.g., tray transport system). System 100 may perform a predefined number of operations (e.g., a branch assembly and/or repeating layer process) by respective devices (e.g., stacker, operator device, xy or xyz gantry, robot and/or actuator) of stations 102.

System 100 may identify finished, defective and unfinished parts by sensor 110 and transfer completed parts to an finished container or defective parts to a discard container by one or more devices (e.g., empty tray transport) of station 102p. System 100 may maintain unfinished parts on transport system 106 for a next or additional branch assembly and/or repeating layer process by assembly system 100 and devices of stations 102a-p.

As shown in FIG. 1, system 100 may include baseline system 100a. System 100a may include one or more of stations 102 (e.g., 102a-p), access device 104, and transport system 106. Stations 102 of system 100a may include main stations directly on or integral to transport lines 106a-d. Transport system 106 may be configured in a loop arrangement forming an open central space. Parts may move about the loop arrangement with each station 102 performing a respective operation to the parts.

Figure 2:
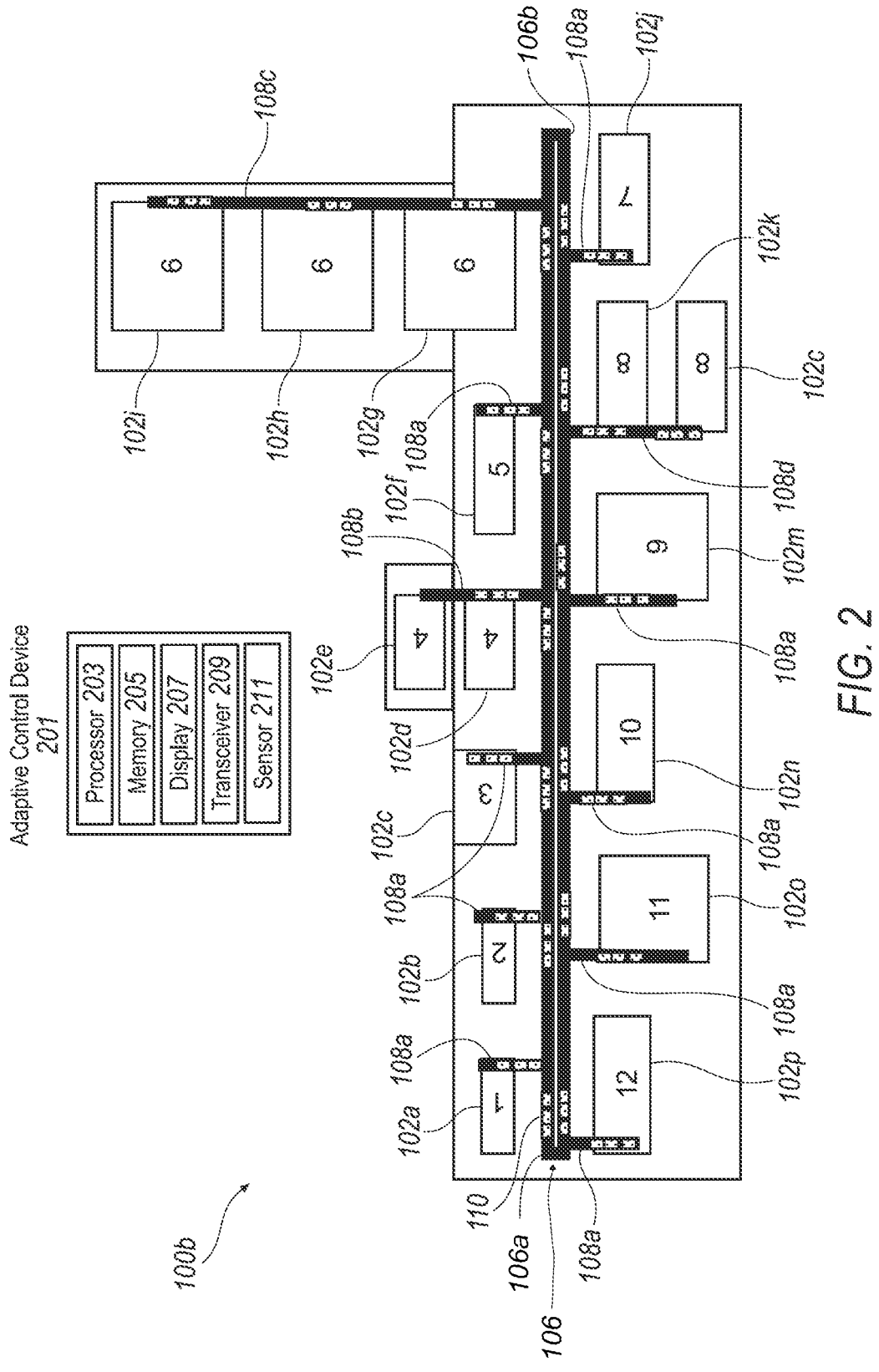
FIG. 2 illustrates another exemplary system of the present disclosure, e.g., a baseline footprint and/or arrangement.

FIG. 2-6 illustrate system 100 including any of systems 100b-f, e.g., branch assembly systems. As shown in FIG. 2, systems 100b may include stations 102 (e.g., 102a-p) and transport system 106 configured to optimize a branch assembly process having one or more main and branch operations. Transport system 106 may include one or more main transport lines 106 (e.g., 106a-d) and one or more branch transport lines 108 (e.g., 108a-d).

Branch lines 108a-d may include respective branch stations 102 having one or more corresponding operations. For example, branch lines 108a may each include one or more branch stations 102, branch lines 108b-d may include two or more branch stations 102, or a combination thereof. Any of branch lines 108a-d may be modular and scalable for any order and quantity of branch stations 102 having corresponding operations.

Transport system 106 may be configured to move one or more parts 110 through one or more main transport lines 106 (e.g., 106a-d), stations 102 (e.g., 102a-p), and branch transport lines 108 (e.g., 108a-d). The transport system 106 may move one or more parts 110 to one or more main and branch stations 102 having corresponding main and branch operations. Main stations may be directly on or integral to transport lines 106a-d.

Each transport line 106 be connected to one or more branch lines 108a-d having branch stations 102a-p associated with one or more tasks or operations. Each branch line 108 may extend substantially transverse or perpendicular to one or more respective transport lines 106a-d. Each branch line 108 may include one or more branch stations 102a-p having one or more operations, e.g., redundant or unique relative to the main or other branch operations.

Each station 102 may perform its corresponding operation and confirm completion of the corresponding operation. Upon completion of each operation, transport lines 106a-d may move the one or more parts to the next main or branch station 102 for the next operation of the branch assembly process, move past and not enter any main or branch stations 102 not associated with the next operation, or a combination thereof. The transport system 106 may be configured to optimize part quantities to ensure continuous flow of parts for optimized throughput.

Figure 3:
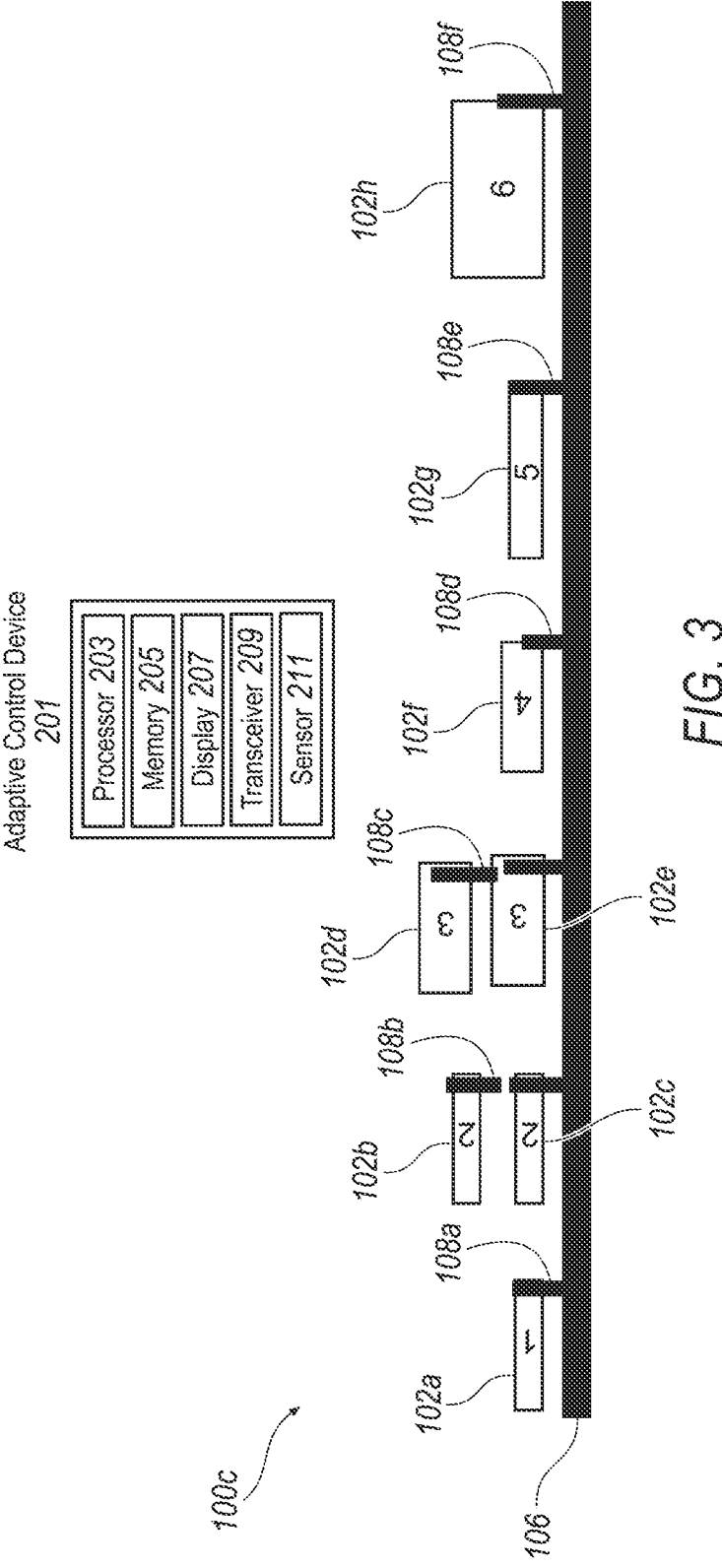
FIG. 3 illustrates another exemplary system of the present disclosure, e.g., a first footprint and/or arrangement.

As shown in FIG. 3, system 100c may include stations 102 (e.g., 102a-h) and transport system 106 configured to optimize a branch assembly process having one or more main and branch operations. Transport system 106 may include transport line 106, e.g., a unitary transport line, and branch transport lines 108 (e.g., 108a-f).

Branch lines 108a-f may include respective branch stations 102a-h having one or more corresponding operations. Branch lines 108a, d-f may each include one branch station 102. Branch lines 108b-d may include two or more branch stations 102. Any of branch lines 108a-f may be modular and scalable for any order and quantity of branch stations 102 having corresponding operations.

Figures 4, 5:
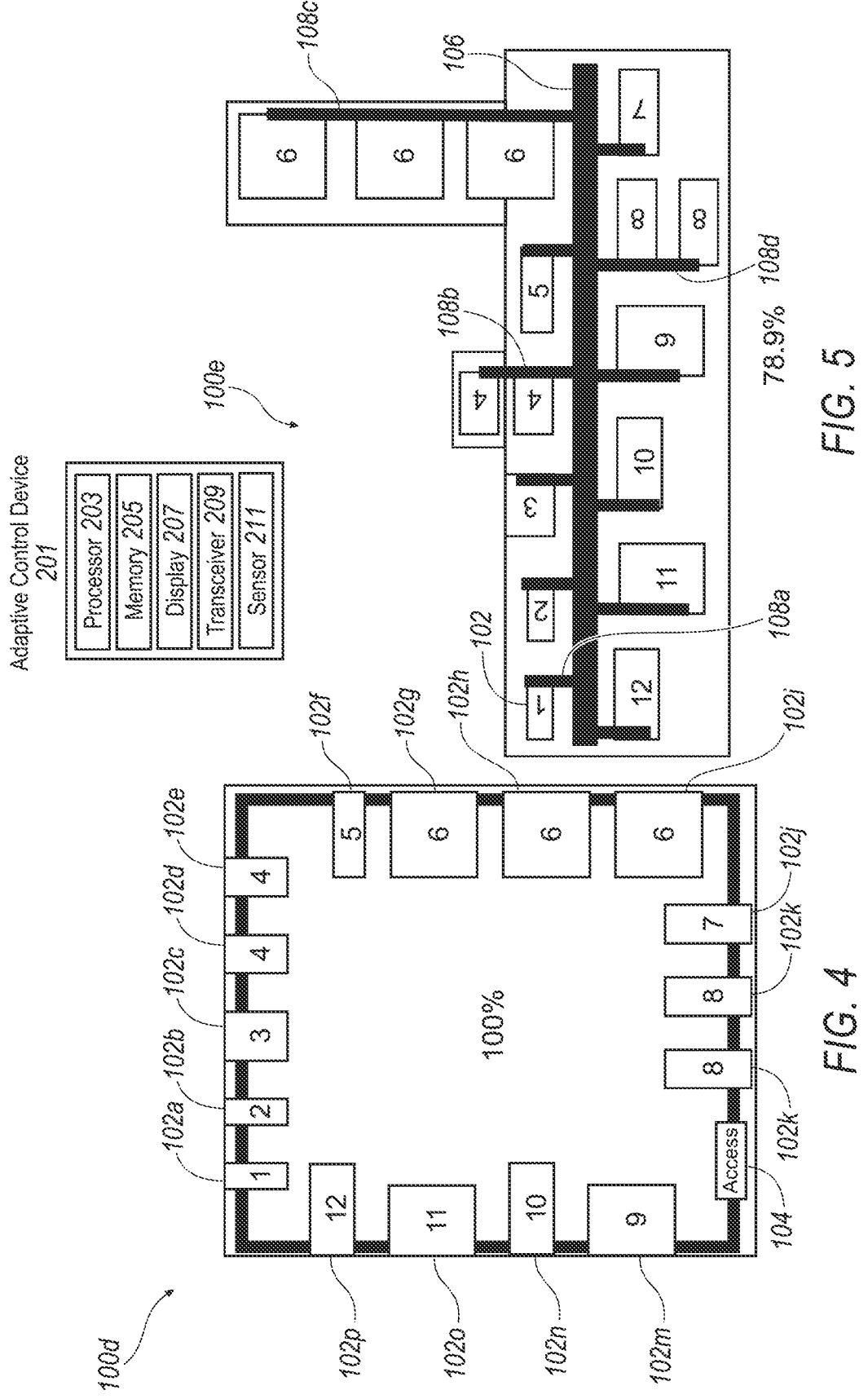
FIG. 4 illustrates another exemplary system of the present disclosure, e.g., a second footprint and/or arrangement.
FIG. 5 illustrates another exemplary system of the present disclosure, e.g., a third footprint and/or arrangement.

Referring to FIGS. 4-5, system 100d may include a baseline arrangement and system 100e may include a branch assembly arrangement. For example, system 100d may represent 100% consumption of equipment while system 100e may represent 78.9% consumption of equipment. A branch assembly arrangement may require less equipment for optimized throughput.

Figure 6:
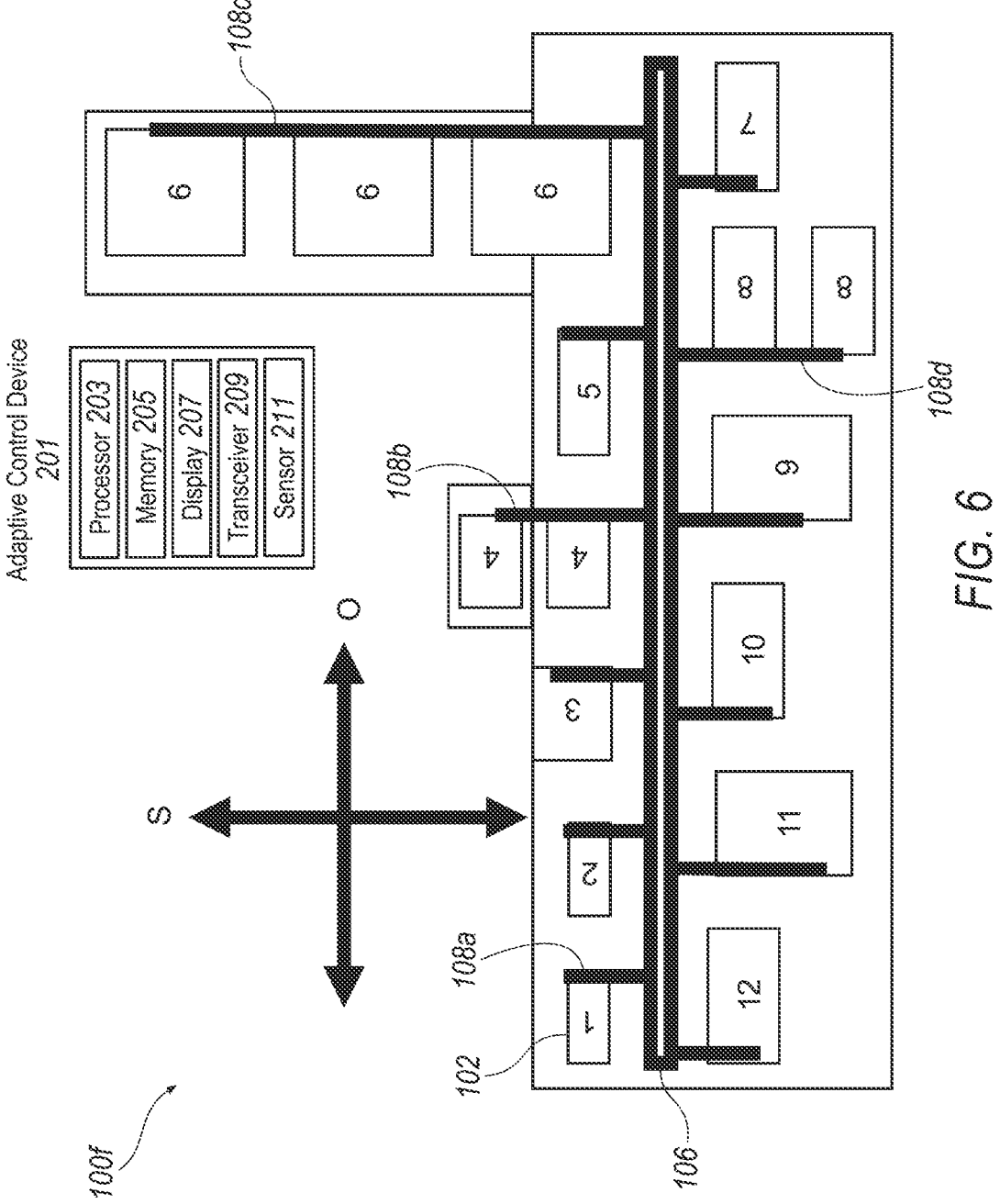
FIG. 6 illustrates another exemplary system of the present disclosure, e.g., a fourth footprint and/or arrangement.

FIG. 6 illustrates system 100f including a branch assembly system. Each station 102 along a first or operations (O) axis provides predefined operations. Each station 102 along a second or scale (S) axis provides increased capacity by distributing tasks for the predefined operations. System 100 may change, add, or remove stations 102 along any O and/or S axes to dynamically adjust throughput of system 100.

System 100 may be configured for improved or unlimited scalability. Any operation can be scaled infinitely with additional or different operations being expanded along the O axis and additional or different tasks for the same operation being expanded along the S axis. Operations may be added without interrupting production, e.g., adding operations and/or tasks to the ends of the O and/or S axes. System 100 may provide a reduced footprint, increased surrounding space, reduction of waste, and flexibility in balanced and unbalanced systems.

Any component of system 100 may include a hardware processor, physical memory, hardware display, hardware transceiver, server, database, and computing network may be configured store, communicate, display, and adapt information and transfer the information with respect to any other component therein.

System 100 may provide information that may include or relate to any of the operations herein, instructions executed by the processor, in response to one or more user inputs, outputs, heuristics, user interfaces, sensor information, cycle time, parts/jobs per hour, parts/jobs per year, geospatial information, location, x-y gantry, x-y-z position, proximity, time, temperature, quality, transparency, weight, part, machine and/or user information, or any combination thereof.

System 100 may communicate, by way of the processor, memory, display, transceiver, and network, any information between one or more station 102, display 207, server, database, or any combination thereof. Transport system 106 any machine configured to perform one or more processing, machining, assembly and/or tooling operations including, e.g., feed tray transport, empty tray transport, assembly tray transport, stacker, operator device, x-y or x-y-z gantry, robot and/or actuator.

Display 107 may include one or a combination of computing, input-output, display and/or hardware devices such as a computer, mobile phone, smartphone, desktop, laptop, tablet, headset, handheld, watch and/or touchscreen device. System 100 may adapt by the processor and/or display any information and operations herein. System 100 may include one or more sensor to provide sensor information and/or to trigger any of the operations herein, e.g., identify respective parts having completed, defective and unfinished layers.

Transport system 106 may be configured to add, remove, and position parts for a predefined number of operations for a branch assembly system by respective stations 102. Transport system 106 may include a stacker, operator device, x-y or x-y-z gantry, robot and/or actuator. Transport system 106 may be configured to identify finished, defective and unfinished parts by sensor, transfer completed parts to a finished container or defective parts to a discard container (e.g., empty tray transport), and maintain unfinished parts on Transport system 106 for a next or additional a branch assembly system by system 100 and stations 102.

This disclosure is intended to be illustrative and not restrictive. All or any portion of the systems, devices, processes, methods, and steps herein may be used in combination, occur in any arrangement, order, or sequence, or occur simultaneously. Any components or steps may be added, omitted, or duplicated. The descriptions herein are provided to illustrate certain embodiments and do not limit the claims.

Many embodiments and applications other than the examples provided would be apparent to an artisan according to this disclosure. The scope should be determined, not with reference to the above description, but should instead be determined with reference to the appended claims, along with the full scope of equivalents to which such claims are entitled. Future developments will occur in the technologies discussed herein, and the disclosed systems and methods will be incorporated into such future embodiments. The embodiments herein are capable of modification and variation.

All terms used in the claims are intended to be given their broadest reasonable constructions and their ordinary meanings as understood by those knowledgeable in the technologies described herein unless an explicit indication to the contrary is made herein. Use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure and shall not be used to interpret or limit the scope or meaning of the claims. Features may be grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of a branch assembly system, the method comprising:

providing a transport system having a main transport line, a branch transport line, and branch stations with branch operations, wherein the branch stations are arranged in series along branches of the branch transport line having respective dedicated connections to the main transport line;

moving by the main transport line a part relative to the branch transport line according to the branch operations;

moving, by the respective dedicated connections of the branch transport line, the part to one of the branch stations associated with at least one of the branch operations;

performing the at least one of the branch operations;

adapting by retracting or extending the branch stations;

confirming completion of the at least one of the branch operations; and moving the part to the main transport line for a next operation.

2. The method of claim 1, wherein the system is structurally arranged in a branch configuration layout configured for the part to be selectively processed through one or more of the branch stations, wherein each of the branches perform a respective operation of the branch operations and each of the branch stations perform a dedicated task corresponding to the respective operation.

3. The method of claim 1, wherein the system is structurally arranged in a branch configuration layout such that the part is processed or assembled by one, a plurality, or all of the branch stations.

4. The method of claim 1, wherein the adapting includes one or more branch processes or branch configuration layouts configured for pre-defined, real-time, or sequenced adaptation of the branch stations with a branch station that is similar or different from the other branch stations.

5. The method of claim 1, wherein the system includes one or more branch processes or branch configuration layouts configured for pre-defined, real-time, or sequenced adaptation of at least one of scale, productivity, and efficiency.

6. The method of claim 1, wherein the system includes one or more branch processes or branch configuration layouts configured for pre-defined, real-time, or sequenced adaptation to add, remove or change one or more branch processes.

7. The method of claim 1, wherein the system includes one or more branch processes or branch configuration layouts configured for pre-defined, real-time, or sequenced adaptation performed manually, automatically, or semi-automatically.

8. The method of claim 1, wherein the system includes one or more branch processes or branch configuration layouts configured for pre-defined, real-time, or sequenced adaptation is performed by one or all of an automated control device and an operator.

9. The method of claim 1, wherein the system includes one or more branch processes or branch configuration layouts including similar or different cycle times.

10. The method of claim 1, wherein the system includes one or more branch processes or branch configuration layouts configured for at least one of a balanced cycle time, an unbalanced cycle time, or an adaptive cycle time.

11. A method of a branch assembly system, the method comprising:

providing a transport system having a main transport line, a branch transport line, and branch stations with branch operations, wherein the branch stations are arranged in series along branches of the branch transport line having respective dedicated connections to the main transport line;

moving by the main transport line a part relative to the branch transport line according to the branch operations;

moving, by the respective dedicated connections of the branch transport line, the part to one of the branch stations associated with at least one of the branch operations; and adapting by retracting or extending the branch stations.

12. The method of claim 11, wherein the system is structurally arranged in a branch configuration layout configured for the part to be selectively processed through one or more of the branch stations, wherein each of the branches perform a respective operation of the branch operations and each of the branch stations perform a dedicated task corresponding to the respective operation.

13. The method of claim 11, wherein the system is structurally arranged in a branch configuration layout such that the part is processed or assembled by one, a plurality, or all of the branch stations.

14. The method of claim 11, wherein the adapting includes one or more branch processes or branch configuration layouts configured for pre-defined, real-time, or sequenced adaptation of the branch stations with a branch station that is similar or different from the other branch stations.

15. The method of claim 11, wherein the system includes one or more branch processes or branch configuration layouts configured for pre-defined, real-time, or sequenced adaptation of at least one of scale, productivity, and efficiency.

16. The method of claim 11, wherein the system includes one or more branch processes or branch configuration layouts configured for pre-defined, real-time, or sequenced adaptation to add, remove or change one or more branch processes.

17. The method of claim 11, wherein the system includes one or more branch processes or branch configuration layouts configured for pre-defined, real-time, or sequenced adaptation performed manually, automatically, or semi-automatically.

18. The method of claim 11, wherein the system includes one or more branch processes or branch configuration layouts configured for pre-defined, real-time, or sequenced adaptation is performed by one or all of an automated control device and an operator.

19. The method of claim 11, wherein the system includes one or more branch processes or branch configuration layouts including similar or different cycle times.

20. The method of claim 11, wherein the system includes one or more branch processes or branch configuration layouts configured for at least one of a balanced cycle time, an unbalanced cycle time, or an adaptive cycle time.

* * * * *